United States Patent [19]
Cartellone

[11] Patent Number: 5,837,020
[45] Date of Patent: Nov. 17, 1998

[54] ROOM AIR CLEANER

[75] Inventor: Mark A. Cartellone, Broadview Hts., Ohio

[73] Assignee: HMI Industries, Inc., Cleveland, Ohio

[21] Appl. No.: 879,883

[22] Filed: Jun. 20, 1997

[51] Int. Cl.⁶ .................................................. B01D 29/21
[52] U.S. Cl. ............................ 55/459.3; 55/276; 55/331; 55/333; 55/437
[58] Field of Search ............................ 55/276, 331, 333, 55/437, 459.3, 523

[56] References Cited

U.S. PATENT DOCUMENTS

| | | |
|---|---|---|
| 1,921,085 | 8/1933 | Korittke . |
| 2,139,736 | 12/1938 | Durham ................................. 55/459.3 |
| 2,362,933 | 11/1944 | Schaefer . |
| 2,394,923 | 2/1946 | Little . |
| 2,608,268 | 8/1952 | Gerber . |
| 2,627,936 | 2/1953 | Martinet . |
| 2,627,937 | 2/1953 | Martinet . |
| 3,343,344 | 9/1967 | Fairaizl . |
| 3,426,512 | 2/1969 | Nesher . |
| 3,498,032 | 3/1970 | Scott . |
| 3,545,181 | 12/1970 | Young ................................... 55/459.3 |
| 3,616,624 | 11/1971 | Marsh . |
| 3,724,181 | 4/1973 | Benson, Jr. ............................ 55/459.3 |
| 3,804,942 | 4/1974 | Kato . |
| 3,853,512 | 12/1974 | Hayashi ................................ 55/459.3 |
| 3,925,043 | 12/1975 | Matrone . |
| 3,953,184 | 4/1976 | Stockford et al. ..................... 55/459.3 |
| 4,121,916 | 10/1978 | Fricke . |
| 4,339,250 | 7/1982 | Thut . |
| 4,365,980 | 12/1982 | Culbert . |
| 4,377,399 | 3/1983 | Bryson . |
| 4,378,234 | 3/1983 | Suzuki et al. ......................... 55/459.3 |
| 4,385,911 | 5/1983 | Popeil . |
| 4,477,270 | 10/1984 | Tauch . |
| 4,531,956 | 7/1985 | Howorth . |
| 4,627,862 | 12/1986 | Frei . |
| 4,629,482 | 12/1986 | Davis . |
| 4,650,505 | 3/1987 | Magdelain . |
| 4,702,753 | 10/1987 | Kowalczyk . |
| 4,737,173 | 4/1988 | Kudirka . |
| 4,749,390 | 6/1988 | Burnett . |
| 4,750,924 | 6/1988 | Potter . |
| 4,810,269 | 3/1989 | Stackhouse . |
| 4,900,344 | 2/1990 | Lansing . |
| 4,900,346 | 2/1990 | Lutz . |
| 4,927,437 | 5/1990 | Richerson ............................. 55/459.3 |
| 5,141,706 | 8/1992 | Clark . |
| 5,240,478 | 8/1993 | Messina . |
| 5,248,323 | 9/1993 | Stevenson . |
| 5,290,330 | 3/1994 | Tepper . |
| 5,358,443 | 10/1994 | Mitchell . |
| 5,399,319 | 3/1995 | Schoenberger . |
| 5,435,817 | 7/1995 | Davis . |
| 5,443,625 | 8/1995 | Schaffhausen . |
| 5,593,479 | 1/1997 | Frey . |
| 5,641,343 | 6/1997 | Frey . |

FOREIGN PATENT DOCUMENTS

| | | |
|---|---|---|
| 2 653 354 | 10/1989 | France . |
| 27 11 111 | 9/1977 | Germany . |
| 2-187114 | 7/1990 | Japan . |
| 4-197460 | 7/1992 | Japan . |

*Primary Examiner*—Jay H. Woo
*Assistant Examiner*—Minh-Chau T. Pham
*Attorney, Agent, or Firm*—Vickers, Daniels & Young

[57] ABSTRACT

A portable air cleaner designed to remove particles and unwanted gases from a room to provide for a healthier and cleaner environment. The portable air cleaner includes a high air volume circulating design and operates quietly and efficiently. The air exhaust of the air cleaner includes a plurality of arcuate vanes radiating outwardly from the interior of the air cleaner. The vanes are disposed in the air exhaust to reduce pressure drop and to minimize operation noise.

58 Claims, 6 Drawing Sheets

ROOM AIR CLEANER

The present invention relates to the art of air filter systems and more particularly to a high efficiency, low noise portable room air cleaner. The invention is particularly applicable to a portable canister type air cleaner and will be described with particular reference thereto; however, the invention has much broader applications and may be used to filter air in other environments by employing the novel air filtering arrangement as contemplated in the present invention.

INCORPORATION BY REFERENCE

U.S. Pat. Nos. 5,248,323; 5,515,573; 5,593,479; 5,603,741 and U.S. application Ser. Nos. 591,741 filed Jan. 25, 1996 and 632,111 filed Apr. 15, 1996 and now U.S. Pat. Nos. 5,641,343 and 5,651,811, respectively are incorporated herein to illustrate the type of vacuum cleaner and/or air purifier and the type of filter system which the present invention can be used, and to preclude the necessity of repeating structural details relating to such filter systems, vacuum cleaner and air purifiers.

BACKGROUND OF THE INVENTION

As more and more people move to urban environments, there is an ever increasing need to provide a clean air environment at home and in the work place. In urban areas, where polluting levels sometimes exceed maximum values set by the EPA. The need for a clean air environment becomes even more apparent. In view of the posed hazards of these excessive pollutants, the public has demanded a means for removing such pollutants so as to provide a healthy environment for both living and working. Furthermore, many of these particles in the air can act as irritants and/or increase or aggravate people's allergies. Air born pollutants can also contribute to respiratory infections and illnesses which can be hazard to individuals with respiratory problems. Particles in the air may create problems with burning eyes, act as nose and throat irritations, contribute to headaches and dizziness and can result in coughing and sneezing. Furthermore, these particles may include various types of spores, bacteria, viruses or harmful particles which may cause serious illness to a person.

In an effort to reduce such irritants and/or harmful particles, many family homes and offices have incorporated a central filtering system to remove particles entrained in the air. Unfortunately, these systems are very expensive and/or do not remove many of the small particles which can be the most hazardous and irritable to persons such as spores, bacteria, virus and some harmful chemicals. Typically, these filtering systems only remove about 300,000 particles out of about 20 million particles which flow into the filter medium. The small particles which make up a majority of the particles in the air freely pass through conventional filters.

Specialized filters have been developed to remove very small particles. Such filters are known as HEPA filters which stand for High Efficiency Particle Air Filters which, by government standards, are filters with a minimum efficiency of 99.97%. The industry defines HEPA filters as those filters which are efficient in removing 99.97% of the air born particles of the size of 0.3 micron or larger. Such filters are used in ultra clean environments such as in a laboratory, in electronic and biologically clean rooms, in hospitals and the like. These filters have recently been incorporated in air filters for business and individual use.

In U.S. Pat. No. 4,629,482, a portable HEPA room air purifier, is disclosed. The purifier incorporates a cylindrical HEPA filter and the filter is mounted within the filter housing having an air discharge at its base. A centrifugal fan is incorporated in the housing to draw air through the filter and discharge air at the base of the housing. Due to the configuration of the purifier, it is necessary to space the base of the apparatus from the main housing. Such a configuration also requires that the apparatus be designed somewhat larger than some consumers may desire. The discharge of the air at the base of the unit results in the recirculation of particles which had settled out onto the floor. Such recirculation of settled particles places more particles in the room, which can increase particle irritation. The purifier does not incorporate a gas filter to remove irritable or noxious gas from the air.

In U.S. Pat. No. 5,435,817, another type of portable HEPA room air purifier is disclosed. This unit is cylindrical in shape and includes a base discharge. A centrifugal fan is incorporated to draw air into the top of the unit and discharge filtered air at the base of the unit. The unit incorporates an outer deflector wall to radially discharge air at the bottom of the unit, such that the exhaust air is channeled generally circumferentially about the base of the unit. The discharged air at the base of the unit results in the redistribution of settled particles back into the air. The purifier is also absent any mechanism for removing unwanted gases in the air.

Applicants' U.S. patent application Ser. No. 591,741 discloses an improved air purifier design which discharges purified air near the top of the unit to reduce recirculation of settled particles. The air purifier also incorporates an internal air flow design which reduces pressure drop through the air cleaner thereby improving the efficiencies of the air purifier. The air filter further incorporates an improved filtering agent to remove more particles as compared to standard HEPA filters. The efficiencies of standard HEPA filters are all based upon 0.3 micron size particles. Historically, it was believed that such particles were the most difficult to remove from the air. However, recent particle filtration testing has shown that particles the size of about 0.1 micron are the most difficult to remove from the air. Standard HEPA filters do not efficiently remove such small particles and allow such particles to freely pass through the filter medium. An analysis of these small particles has shown that the particles do not naturally fall out of the air, but instead maintain entrained in the air by constantly bouncing off of other particles in the air (i.e. Browning effect). These small particles also have been found to deviate from the air flow thus making such particles even more difficult to remove from the air. The improved particle filter overcomes this particle filtration problem by incorporating a filter which can remove at least about 99.98% of particles about 0.1 micron. The filter system also can include a gas filter to remove unwanted gases in the filtered air.

Although Applicant's air filter disclosed in U.S. application Ser. No. 591,741 greatly improves air purification technology, additional improvements in air purification efficiencies are still demanded. During the air purification process, the air intake section is preferably the largest surface area component of the air purifier so as to maximize the size of the air filter and volume of air to be purified. However, when the air intake is enlarged, the air purification unit must be enlarged since the reduction in size of the air exhaust will cause an increase in pressure drop and significant reductions in efficiencies. In order to overcome the increased pressure drop, larger motors must be used which are more costly, noisier and use more energy. In addition to the noise caused by the increased motor size, the velocity of air through the smaller air exhaust region results in additional noise during operation. In view of the foregoing, there is a need for a new air exhaust design which is compact in size, does not cause significant increases in pressure drop and can dampen the noise caused by air traveling through the air exhaust.

SUMMARY OF THE INVENTION

The invention relates to compact portable room air cleaner and will be described with particular reference thereto, however, it will be appreciated that the air cleaner can be used in general industrial levels and in other environments wherein it is desirable to remove very small particles and/or undesirable gases from the environment.

In accordance with a preferred embodiment of the present invention, there is provided a portable air cleaner which includes a housing having an inner chamber. The exterior of the housing includes an air exhaust and an air intake. The air intake is preferably located below the air exhaust so as to draw air into the air cleaner near the base of the air cleaner and to expel filtered air at or near the top of the housing. The air being drawn into the base of the housing does not re-blow settled particles at or near the housing base back into recirculation into the room. If any settled particles are disturbed, these particles are immediately drawn into the air cleaner and filtered out of the air. The air expelled by the air exhaust preferably at the top of the housing is distanced from the floor where settled particles exist thus the expelled air does not cause settled particles to be recirculated in the room. The air intake and air exhaust are preferably located about the complete peripheral edge of the housing so as to draw in and expel air essentially around the complete peripheral surface of the housing. This design of the air intake and air exhaust maximizes the surface area in which the air can be drawn in and expelled from the air cleaner. As a result, large volumes of air can be filtered by the air cleaner. Furthermore, the velocity of the air into and out of the air cleaner is reduced due to the large surface area of the air intake. The reduced velocity of the air into the air cleaner reduces problems of stirring settled particles near the air cleaner. The design of the air cleaner to both draw and expel air around the periphery of the housing allows the air filter to be positioned in various places in a room without concern for blocking the air flow into the air intake or out of the air exhaust.

In accordance with yet another aspect of the present invention, the air exhaust includes a plurality of arcuate shaped vanes. Preferably, the vanes are symmetrically spaced about the periphery of the air exhaust. One end of the vane is spaced from the blower fan to effectively draw filter air from the blower fan. Once the filtered air is drawn from the blower fan, the air is directed outwardly along the outwardly radiating arcuate vane. The use of the arcuate vanes eliminates the need of a mesh screen about exhaust section. The use of a typical mesh type screen causes a significant pressure drop as the air passes through the multitude of openings. The elimination of the use of a traditional mesh design and the use of the new vane design overcomes the pressure drop problems thereby allowing larger volumes of air to be expelled in a given surface area. Therefore, a smaller size of air exhaust can be used for a given pressure drop and volume of air expulsion as compared to a mesh screen air exhaust design. As a result, the size of the air exhaust can be reduced which in turn can reduce the size of the air cleaner. Furthermore, a larger motor does not need to be used for a smaller air exhaust since comparable pressure drops are obtained even though the vane design air exhaust occupies a smaller area than a mesh design air exhaust.

In accordance with another aspect of the present invention, the end of the vane spaced closest to the blower fan is sloped. The sloped surface design performs several functions such as reducing air noise and increasing the efficiency by which the air is drawn from the blower fan. As the leading end of a vane is positioned closer to the blower fan, more air is drawn away from the blower fan by the vane. The increased amount of drawn air from the blower fan increases the efficiency to which the blower fan draws air into the air cleaner and expels the filtered air. However, the closer the leading end of the vane is positioned to the blower fan during operation, the louder the air cleaner operates. The increased noise levels are caused by the high velocity air contacting the leading end of the vane and causing a whistling sound. In addition, the high velocity air can cause the vane to vibrate which also results in noise. The vibration and whistling can be reduced or significantly eliminated by increasing the space of the leading edge of the vane from the blower fan. However, the increasing of the spacing of the vane leading edge from the blower fan reduces the efficiency at which the air is drawn from the blower fan, thus reducing amount of air drawn into the air cleaner. It has been found that by sloping the leading edge of the vane, the amount of whistling noise and vibration is significantly reduced. As a result, the leading edge can be placed closer to the blower fan to increase air withdrawal efficiencies without increasing operation noise. The sloped vane surface preferably slopes from the top to the bottom of the vane. Preferably, the sloped angle is about 10–50 degrees and more preferably 20–40 degrees. The sloped surface may be a linear or straight surface or be a curved surface. Such a sloped surface vane design enables the vane to be closely positioned to the blower fan without an increase in noise. Preferably, the leading end of the vane is spaced within one inch of the blower fan and more preferably, 0.05 to 0.4 inch from the blower fan. As can be appreciated, the leading end of the vane may be sloped from bottom to top and still reduce operation noise. The use of a sloped surface vane as compared to a straight surface vane also more efficiently draws air from the blower fan during operation, thus further increasing the efficiencies of operation.

In accordance with still another aspect of the present invention, the leading end of the vane has a tapered edge. The tapered edge further reduces operation noise and increases air withdrawal efficiencies from the blower fan.

In accordance with still yet another aspect of the present invention, the air exhaust includes one or more air guides positioned between two vanes. The air guides assist in evenly distributing the air as it is expelled from the air cleaner thereby reducing the air velocity from the air cleaner via a diffusion effect. The filtered air leaving the air exhaust may be expelled in a jet stream matter. The air guide assists in breaking up this jet stream so the air more evenly exits the air exhaust. The reduction or prevention of the jet stream air flow tendency reduces the amount of settled particles which are stirred up as the air exits the exhaust. The air guide also can function to limit access between the vanes.

In accordance with yet another aspect of the present invention, motor mechanism is located within the housing to draw air through the air intake, through one or more filters, into the inner chamber of the housing and to expel the air out through the air exhaust. The motor mechanism preferably includes an electric motor which drives a fan for creating a vacuum in the inner chamber of the housing which results in air being drawn into the air intake and through the one or more air filters. Disposed between the air intake and inner chamber is a particle filter designed to mechanically remove a wide variety of particles entrained in the air. Preferably, the particle filter is a particle filter which removes 99.97% of particles 0.3 micron entrained in the air and more preferably, removes 99.98% of particles 0.1 micron.

In accordance with still another aspect of the present invention, a gas filter is used in combination with the one or more fiber filters to remove gases such as smoke, fumes, gas contaminants, or noxious gases from the filter air. The gas filter is generally positioned adjacent to the particle filter. The gas filter is preferably formed of non-woven activated charcoal matting. The gas removing filter preferably includes a layer of activated charcoal material in the form of a non-woven mat impregnated with activated carbon. The mat has a thickness of preferably less than about 1.0 inch and is more preferably a cylindrical mat structure wherein the layer of activated charcoal filtering is approximately ⅛–½ of an inch in thickness. Preferably the mat is a non-woven polyester material impregnated with activated carbon. The gas filter has a normally sponge texture to maximize the surface area for the activated carbon.

In accordance with another aspect of the present invention, both the particle filter layer and the gas removing filter layer are cylindrical in shape to maximize the surface area of filtration to provide increased particle and gas removal. The filters are preferably positioned adjacent to one another thereby minimizing the area taken up by the filters and to ensure that the filters are properly positioned in the air cleaning system.

In accordance with yet another aspect of the present invention, a support mechanism is employed to maintain the one or more filters in the air cleaner in a proper position and to support the filters during the filtration of the air. The support mechanism may be incorporated into the filters themselves or may be an external mechanism such as a frame to hold the filters in place. The support mechanism is designed to support and maintain the filters in position without impairing the air flow through the filters.

In accordance with another aspect of the present invention, the air filters in the air cleaner do not cause a large pressure drop as the air passes through the filter system. The fibers in the particle filter are designed to trap particles entrained in the air as they pass through the filter and not impair the air flow through the air filters. Furthermore, the other components of the air cleaner are designed to minimize pressure drop through the air cleaner. As a result, the air cleaner can use a smaller motor so that the air cleaner can have a more compact and portable design.

The primary object of the present invention is the provision of an air cleaner which can efficiently and effectively filter out particles entrained in the air.

Another object of the present invention is the provision that the novel air cleaner is designed to have a large volume of air intake and large volume air exhaust with low air velocity into and out of the air cleaner.

Yet another object of the present invention is the provision that the filter element in the air cleaner can be easily changed when the filter becomes clogged or partially clogged.

Still a further object of the present invention is an air cleaner which includes using a particle element in combination with a gas removing filter so that the filters remove both particles and unwanted gases from the air by the air cleaner.

In accordance with another object of the present invention, the particle filter and the gas filter are disposed in a coterminous relationship to one another and supported by support structure.

In accordance with another aspect of the present invention, the air cleaner is designed to minimize the air pressure drop throughout the air cleaner thereby reducing the need for a large motor do draw in and expel air from the air cleaner.

In accordance with yet another object of the present invention, the discharge of air is expelled by outwardly radiating vanes which reduce pressure drop and operation noise.

In accordance with another object of the present invention, the vanes are specially designed to reduce operation noise and have improved air withdrawal efficiencies.

In accordance with still another object of the present invention, the air exhaust includes air guides to evenly disperse filter air from the air exhaust.

It is another object of the present invention to provide an air cleaner wherein the discharge of the air is generally radially outward from the entire periphery of the air cleaner housing so as to uniformly distribute filtered air.

It is another object of the present invention to provide an air cleaner wherein air is drawn radially inwardly from the entire periphery of the unit near the base of the unit and the air is discharged outwardly about the entire periphery of the unit above the air intake.

In accordance with yet another object of the present invention, the air cleaner discharges filtered air without disturbing and/or causing settled particles to be recirculated in an environment.

It is still another object of the present invention to design a compact and portable air cleaner which can be easily moved to different rooms by a user.

These and other objects and advantages will become apparent to those skilled in the art upon reading the following description taken together with the accompanying drawings.

BRIEF DESCRIPTION OF THE DRAWINGS

Reference is now made to the drawings, which illustrate various embodiments that the invention may take in physical form and in certain parts and arrangement of parts herein.

PREFERRED EMBODIMENTS OF THE INVENTION

Figure 1:
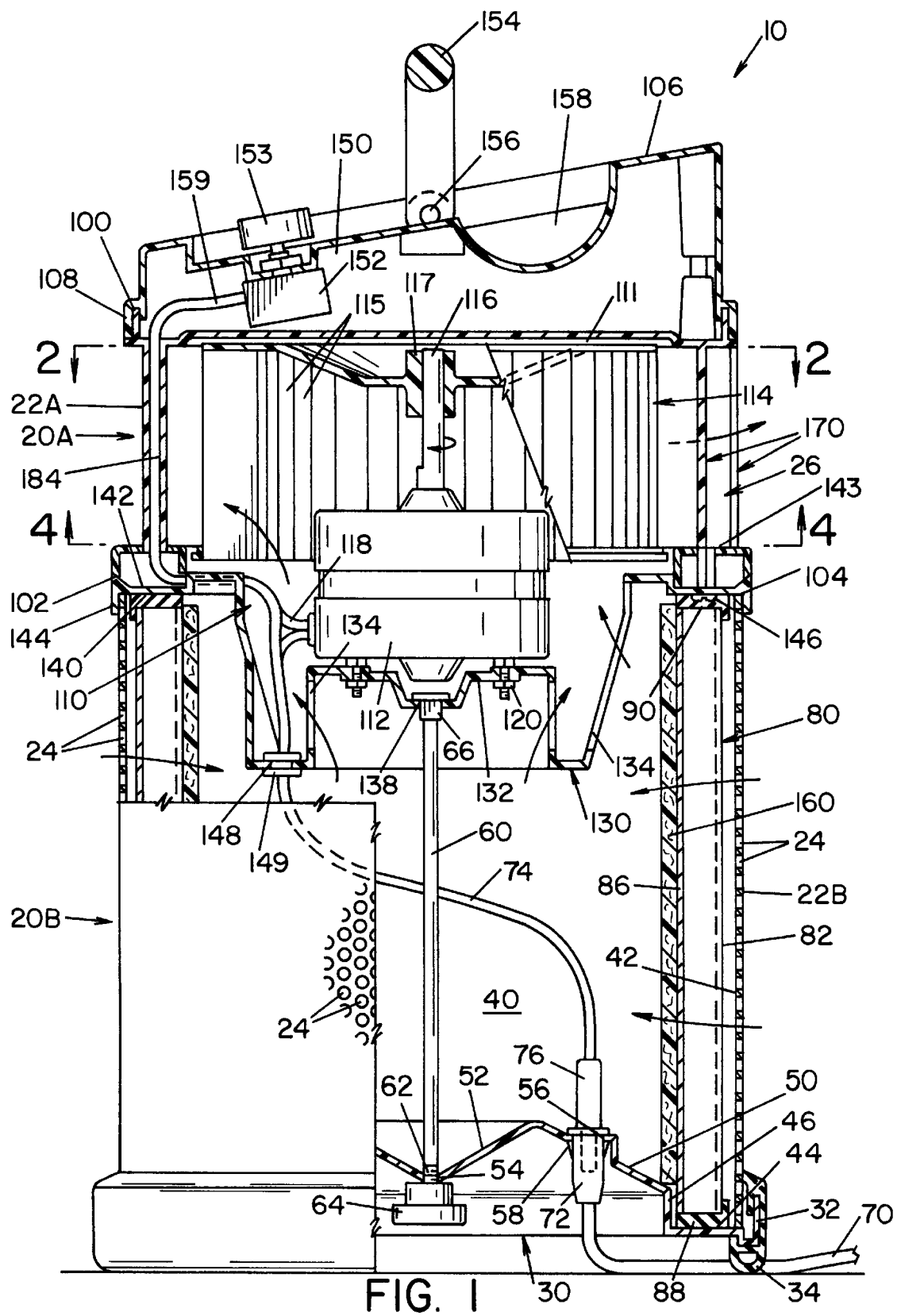
FIG. 1 is a cross-sectional view of the assembled air purifier of the present invention.

Referring now to the drawings wherein the showings are for the purpose of illustrating the preferred embodiment of the invention only and not for the purpose of limiting the same, FIG. 1 illustrates a portable air cleaner 10. Air cleaner 10 includes a housing made up of an upper housing 20A and a lower housing 20B. Both the upper and lower housings are preferably cylindrically shaped. Lower housing peripheral surface 22B includes air intake 24. Air intake 24 is preferably positioned about the complete peripheral surface of lower housing 20B and includes multiple holes or slots in peripheral surface 22B. The size of the slots or holes in air intake 24 are preferably sized such that a user cannot insert his or her fingers into the slots or holes and damaging the interior of air cleaner 10.

Figure 2:
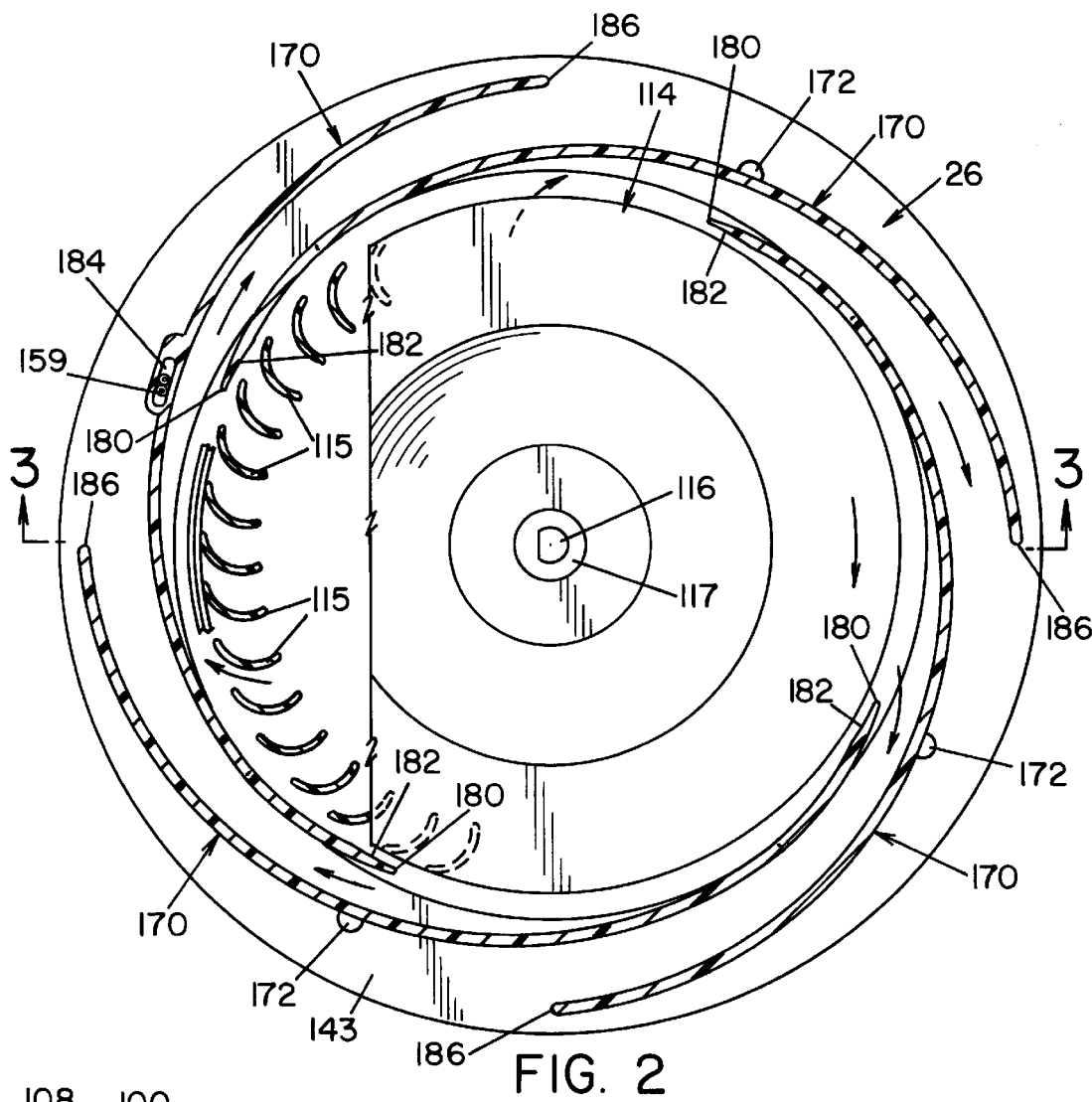
FIG. 2 is a cross-sectional view taken along line 2—2 of FIG. 1.

Air intake 24 is positioned on the lower part of air cleaner 10 so as to draw in the air at or near the base of air cleaner 10. This positioning of air intake 24 is opposite that of prior art air cleaners wherein the air exhaust was located at or near the base of air cleaner 10. Air cleaner 10 reduces and/or prevents the recirculating of settled particles by intaking air at or near the base of air cleaner 10 and expelling the filtered air at or near the top of the air cleaner. Any particles which are disturbed by the air flow into the air cleaner will be drawn into the air cleaner and filtered by the air cleaner. The positioning of the air intake about the complete peripheral surface of the lower housing results in a larger surface area for the air flowing into the air cleaner resulting in a high volume of air drawn into the air cleaner without creating high velocities of air into the air cleaner. The velocity reduction of the air into the air cleaner reduces and/or prevents problems associated with disturbing settled particles about the air cleaner are significantly reduced. Mounted onto lower housing base 30 is a bumper 34. Bumper 34 is connected to the lower housing by bumper leg 32 which is positioned outside of the peripheral surface 22B adjacent to base surface 44 as illustrated in FIG. 2. Bumper 34 is preferably made up of a plastic or rubber material which is designed to absorb vibration and noise thereby providing for a quiet operation of air cleaner 10.

Referring again to FIG. 1, upper housing 20A includes an upper housing peripheral surface 22A which incorporates air exhaust 26. Air exhaust 26 is positioned completely about the peripheral surface 22A. The air exhaust includes a plurality of vanes 170, which function and design will be described in more detail below. The positioning of the air exhaust about the complete peripheral surface of the upper housing increases the surface area of the openings of the air exhaust thereby allowing a large volume of air to be expelled from air cleaner 10 without creating high air velocities. As discussed above, high velocity air can cause settled particles to be inadvertently recirculated into a room. The positioning of air exhaust 26 on upper housing 20A also distances the air exhaust from the base of air cleaner 10 thereby significantly reducing the chance that the filtered air exiting air cleaner 10 will disturb any particles which have settled on a floor near air cleaner 10.

Lower housing 20B includes an inner chamber 40. Inner chamber 40 is preferably cylindrical in shape and has a generally constant cross-sectional diameter along the longitudinal axis of the inner chamber. Inner chamber 40 includes a side wall 42 which defines the interior surface of air intake 24. The interior chamber also includes a base surface 44.

A filter ledge 46 is positioned on base surface 44 and spaced from side wall 42. The filter ledge extends about base surface 44 of inner chamber 40. Filter ledge 46 preferably is mounted at an angle perpendicular to base surface 44 and essentially parallel to side wall 42.

Extending from the top of filter ledge 46 is air deflector 50. Air deflector 50 extends at some non-perpendicular angle from filter ledge 46 toward the interior of inner chamber 40. The air deflect also extends completely about the central axis of the inner chamber. The slope surface of air deflector 50 causes the air entering inner chamber 40 to be directed upwardly and toward air exhaust 26. Air deflector 50 extends into the interior of inner chamber 40 until it contacts motor support guide surface 52. Guide surface 52 extends toward the central axis of inner chamber 40 at a downward angle. Guide surface 52 extends uniformly about the central axis of inner chamber 40 thereby forming a conical surface near the central axis of inner chamber 40. Guide surface 52 is designed to guide threaded surface 62 of motor support 60 toward support hole 54 located at the central axis of inner chamber 40. As illustrated in FIG. 1, filter base surface 44, air deflector surface 50 and guide surface 52 define the complete base of lower housing 20B.

As best shown in FIG. 1, particle filter 80 is positioned between side wall 42 and filter ledge 46. Preferably, particle filter 80 is cylindrical in shape and has a thickness which is less than or equal to the distance between side wall 42 and filter ledge 46. As shown in FIG. 1, filter ledge 46 maintains particle filter 80 in position so that the particle filter does not move as air enters intake 24 and passes through particle filter 80. Particle filter 80 is positioned on top of filter support 88. The filter support and the filter ledge maintain the bottom edge of particle filter 80 in proper position with respect to the base of lower housing 20. As shown in FIG. 1, filter support 88 provides a small space between filter outer layer 82 and side wall 42. This small space ensures that particle filter 80 is not damaged during the operation of a filter. Filter support 88 also acts as an air seal to prevent air from flowing under the particle filter 80 and into the interior of inner chamber 40 without being filtered.

At the top of particle filter 80 is a filter seal 90. This filter seal works in conjunction with filter support 88 to maintain particle filter 80 in its proper position within inner chamber 40 throughout the longitudinal axis of the inner chamber. Filter seal 90 creates a small space between filter outer layer 82 and side wall 42. Filter seal 90 also prevents air from traveling about the top of particle filter 80 and into the interior inner chamber 40 without prior to being filtered.

Particle filter 80 is preferably an HEPA filter which is designed to remove at least 99.97% of particles entrained in the air which are about 0.3 microns in size and preferably removes at least 99.98% of particles about 0.1 micron in size. The particle filter is preferably suitable for use in high temperature and high stress environments. One filter which can preferably be used is the filter disclosed in U.S. patent application Ser. Nos. 591,741 and 632,111.

As shown in FIG. 1, air cleaner 10 includes a gas filter 160 positioned coterminous to inner layer 86 of particle filter 80. Carbon filter 160 is preferably cylindrically shaped and is formed of a layer of non-woven activated charcoal matting. The activated charcoal is preferably impregnated into the non-woven mat. The mat preferably has a thickness of less than about 1 inch and is preferably no more than about ⅛–½ of an inch in thickness. The non-woven mat is preferably a non-woven polyester material that is impregnated with activated carbon. The non-woven polyester material has a cellulose configuration which significantly increases the surface area to which the air interacts the non-woven filter thereby increasing the efficiency of gas removal. The gas filter is designed to remove irritating and/or noxious gases which freely pass through particle filter 80.

Referring again to FIG. 1, upper housing 20A includes a motor chamber 110.

Motor chamber 110 includes a chamber top 111 which defines the top of the chamber. Within motor chamber 110 is positioned centrifugal fan 114 including a plurality of fan blades 115. The centrifugal fan 114 includes a fan mount 117 which connects to motor shaft 116 of motor 112. Centrifugal fan is designed to be rotated by motor 112 and to draw air into inner chamber 40 through air intake 24 and expel air through air exhaust 26. As the air is drawn from inner chamber 40, a vacuum is created within inner chamber 40 which causes the air outside of air cleaner 10 to be drawn through air intake 24 and through particle filter 80 and carbon filter 160. Motor 112 is preferably an electric motor which is energized by electricity traveling through motor cord 74 and into motor 112 via motor power cord inlet 118. Motor cord 74 is connected to an external power source by motor cord connector 76 connecting to power cord connector 72 in cord connector hole 56 of air deflector surface 50 located at the housing base 30. Power cord connector 72 is secured in connection hole 56 by connector clip 58. The power cord 70 extends from power cord connector 72 to an electrical outlet thereby providing energy or electricity to motor 112. The speed at which motor 112 is operated can be varied by switch 152 located in switch chamber 150. Switch chamber 150 is formed by top section 106 being mounted onto air exhaust top edge 100 at top section mounting surface 108. Switch 152 may be mounted into switch chamber 150 by a nut arrangement or other mounting arrangement. Switch 152 includes a switch knob 153 which can be rotated by the user to vary the power to motor 112 via switch cord 159 to increase and decrease the motor speed. The motor is preferably designed to include an over heating reset to temporarily shut off the motor when it overheats. Such overheating can be caused by the insufficient flow of air through the air cleaner caused by clogged filters.

As illustrated in FIG. 1, motor 112 and centrifugal fan 114 are maintained in motor chamber 110 by motor guard 130. Motor 112 rests upon guard base 132 and is further supported by motor support 60 which extends from motor guard base 132 to housing base 30. Motor guard 130 includes a mount hole 138 which mounts motor support 60 to motor guard 130 by support mount 66. Motor support 60 extends through housing base 30 via support hole 54 in guide surface 52. Motor support 60 is secured at the housing base 30 by screwing on support knob 64 onto thread surface 62 of motor support 60. Motor 112 is energized by motor cord 74 which passes through cord access 148 of motor guard 130. The motor cord 74 is maintained in position in motor guard 130 by access plug 149.

Motor guard 130 is mounted to upper housing 20A by inserting guard connector 146 through mount hole 138. The guard connectors are preferably screws. Motor guard 130 is connected to the base of motor 112 by nut and bolt arrangement 120. Motor guard 130 includes an air seal surface 140 which contacts filter seal 90 to form an air seal between upper housing 20A and lower housing 20B. Motor guard 130 also includes an upper housing seal surface 142 which seals bottom edge 102 of upper housing peripheral surface 22A with motor guard 130. Motor guard 130 further includes a lower housing seal surface 144 which is designed to be slidably engagable about lower housing peripheral surface 22B and air intake top edge 104. Sealing surfaces 142 and 144 on motor guard 130 effectively seal the upper housing 20A and lower housing 20B together when air cleaner 10 is fully assembled.

Motor guard is designed to mount motor 112 into upper housing 20A as described above and to provide a sufficient air flow access from inner chamber 40 to motor chamber 110 so as to minimize the pressure drop between the two chambers. As illustrated in FIG. 1, a space exists between motor 112 and filters 80 and 160. The space allows the filtered air to flow between inner chamber 40 and motor chamber 110. Motor guard 130 is mounted between the space to prevent a user from freely accessing the motor and fan in the motor chamber. Air slots 134 are positioned throughout motor guard 130 to preferably provide a slot space surface area which is at least equal to the cross-sectional surface area of the space between motor 112 and filters 80 and 160. To increase the slot space surface area, motor guard extends from the base of upper housing 20A into inner chamber 40 when the air cleaner is fully assembled as shown in FIG. 1.

Figure 3:
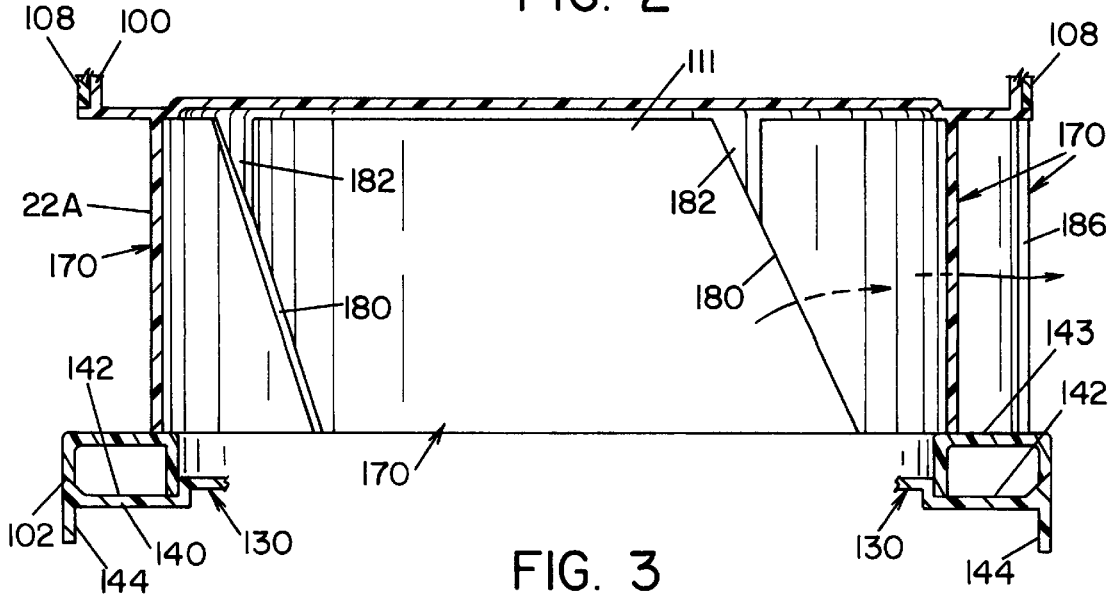
FIG. 3 is a cross-sectional view taken along line 3—3 of FIG. 2.
Figure 4:
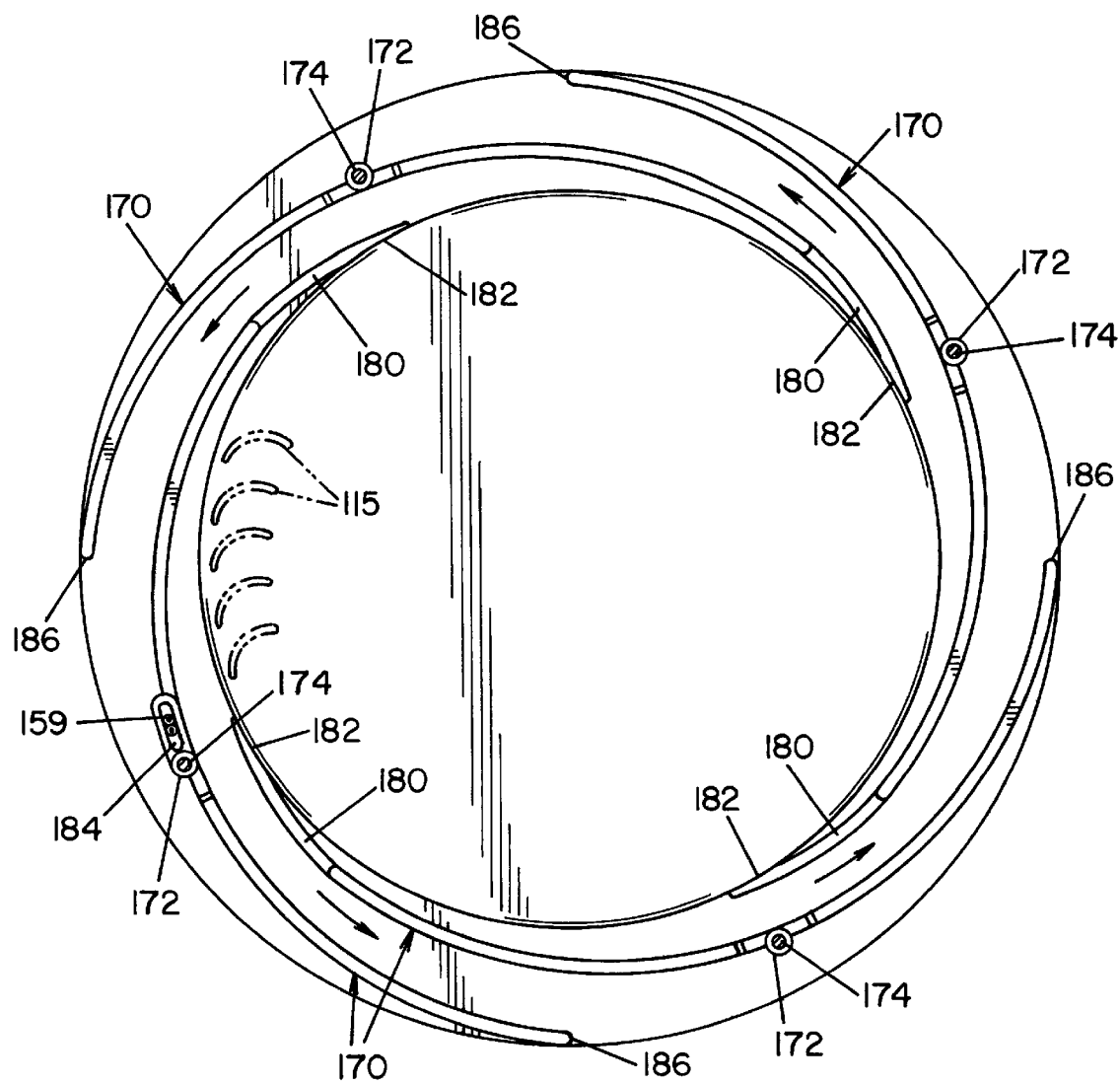
FIG. 4 is a cross-sectional view taken along line 4—4 of FIG. 2.
Figure 5:
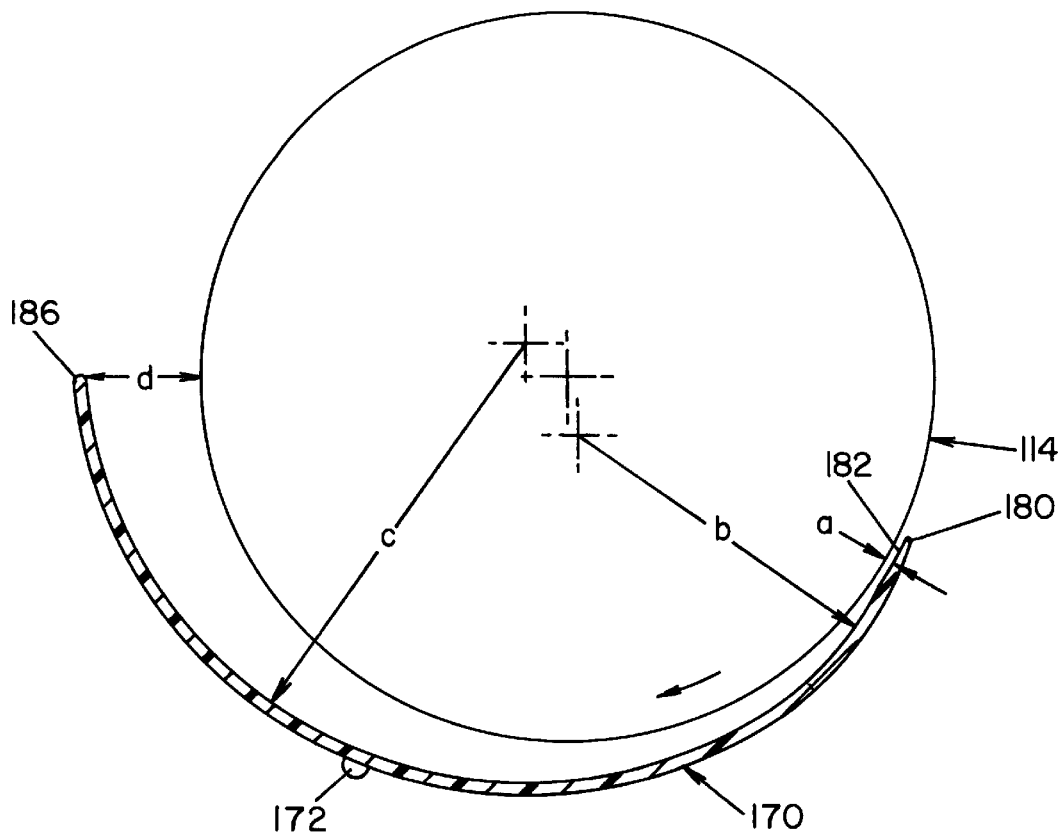
FIG. 5 is a modified view of FIG. 2 illustrating a single vane radiating outwardly from the center of the air purifier of the present invention.
Figure 6:
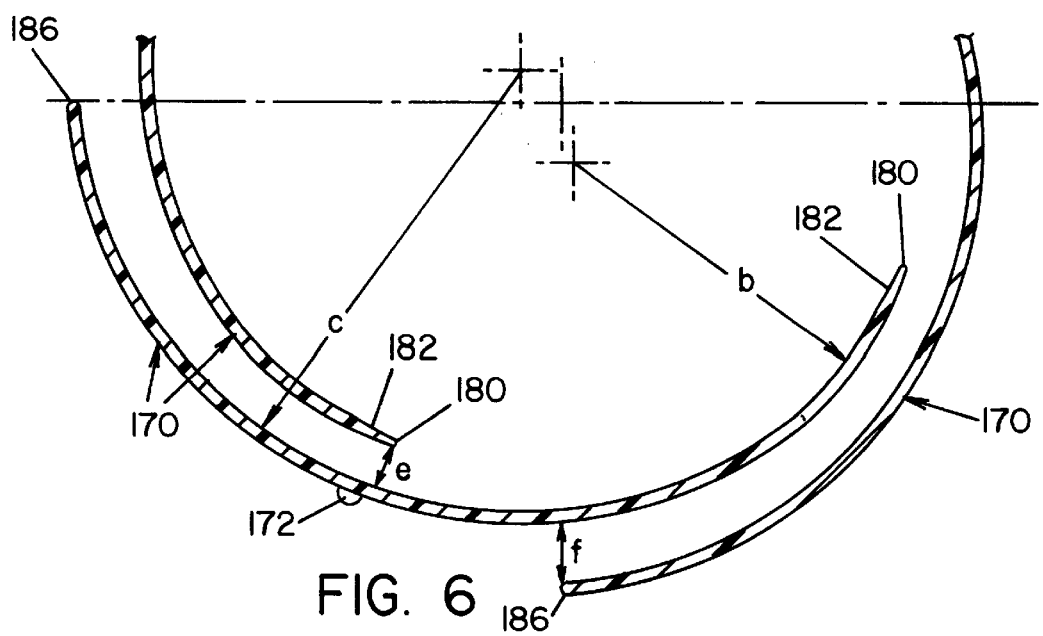
FIG. 6 is a top view of a plurality of vanes positioned about the center of the air purifier of the present invention.

Referring now to FIGS. 2–9, there is illustrated, in detail, the air exhaust 26. Air exhaust 26 includes a plurality of vanes 170 disposed about the perimeter of centrifugal fan 114. FIG. 2 illustrates four vanes 170 spaced symmetrically about centrifugal fan 114. As can be appreciated, more or less vanes may be incorporated into the air exhaust depending on the diameter of the air exhaust. FIG. 2 illustrates a centrifugal fan 114 having a diameter of about 9–13 inches surrounded by four vanes 170 which radiate outwardly to form an air exhaust having a diameter of about 10–14 inches. Each vane is illustrated to be about 12–16 inches in length. As can be appreciated, the diameter of fan 114, and the dimensions of vanes 170 can be varied, depending on dimensional requirements. Each vane 170 includes a front end 180 and a back end 186. The front end is positioned closest to centrifugal fan 114. As best illustrated in FIGS. 5 and 6, the vanes have a varying radius of curvature from the front to back end. The radius of curvature at the front end of the vane is less than the radius of curvature at the back end of the vane. In addition, the center of curvature is positioned differently with respect to different sections of the vane. As a result, the vanes are substantially like volute shaped members positioned about the centrifugal fan.

FIGS. 5 and 6 illustrate the relative distances the vanes are positioned from one another and positioned from the centrifugal fan. Referring specifically to FIG. 5, distance a, representing the distance vane front end 180 is positioned from centrifugal fan 114, is less than distance d, representing the distance vane back end 186 is positioned from centrifugal fan 114. Preferably distance a is less than one inch and preferably 0.05 to 0.4 inch and more preferably, 0.125 to 0.25 inch. A distance a of less than 0.5 inch is preferably for centrifugal fan diameters of less than 36 inches. Distance d is primarily dependent on the desired outer diameter of air exhaust 26. Typically, distance d ranges from about 1.0–2.5 inches for a centrifugal fan having a diameter of about 5–20 inches. Distances b and c represent the radius of curvature of the vane. Distance b is shown to be less than distance c and each radius has a different center of curvature. For a vane of about 12–18 inches in length, distance b is about 3.5–4.5 inches and distance c is about 4.75–5.75 inches. As can be appreciated, different vane curvatures and lengths can be used to accommodate different air purifier designs. However, the vane front end should be positioned closely to the centrifugal fan to remove as much air from the centrifugal fan as possible.

Referring now to FIG. 6, the relative space relationship of the vane with respect to one another is illustrated. Distance e is the distance of vane front end 180 from an adjacently positioned vane and distance f is the distance of vane back end 186 from an adjacently positioned vane. The vanes are positioned about the centrifugal fan such that distance f is greater than distance e. For vanes of 12–18 inches, distance e is preferably about 0.35–0.8 inch and distance f is preferably about 0.5 to about 1.25 inch; however, other distance relationships can be used.

Referring now to FIGS. 2 and 4, the vanes 170 are mounted onto vane mount surface 143 of the upper housing. Each vane 170 includes a plurality of mount holes 172 designed to receive a vane connector 174 to secure the vanes to the upper housing and about centrifugal fan 114. At least one of vanes 170 includes a cord opening 184 to provide access for switch cord 159 from switch 152 to motor 112 as shown in FIGS. 1, 2 and 4.

Figure 7:
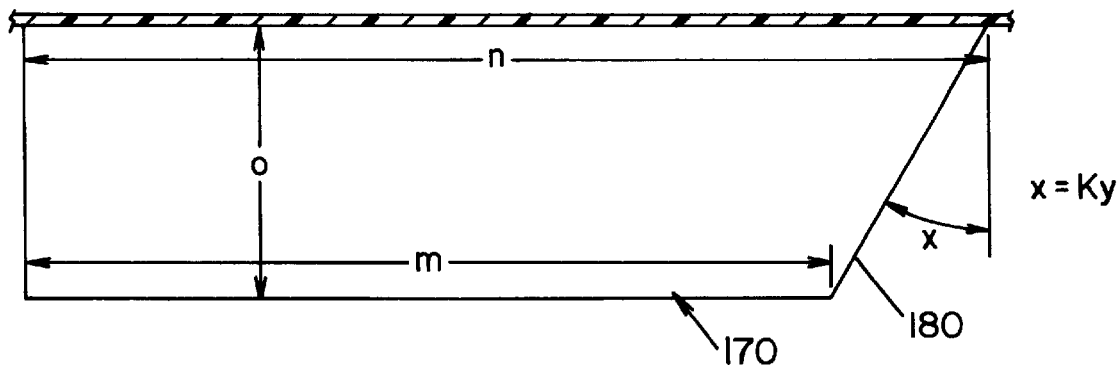
FIG. 7 is a sectional view of the leading end of a vane.
Figure 8:
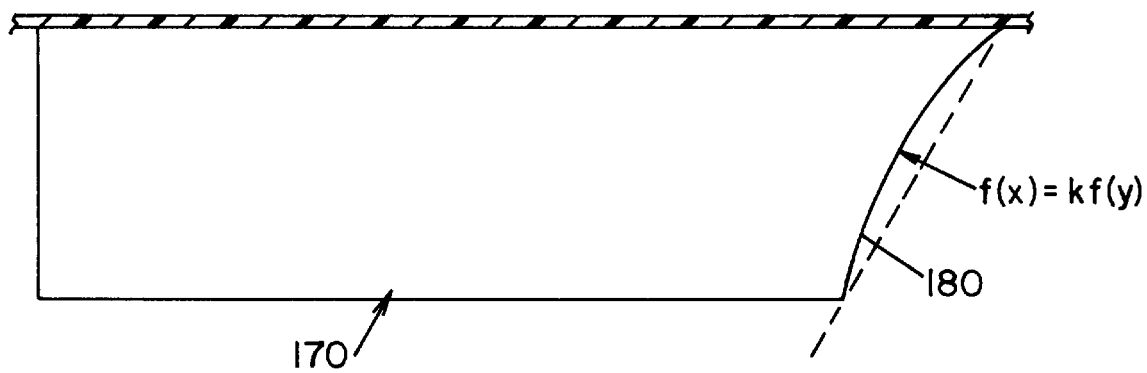
FIG. 8 is a sectional view of an alternative design of the leading end of a vane; and, FIG. 9 is a modified view of FIG. 2 illustrating the use of air guides.

Referring now to FIGS. 3, 7 and 8, vane front end 180 is a sloped surface which slopes downwardly from the top to the bottom of the vane. FIG. 7 illustrates the sloped surface as being a linear slope and FIG. 8 illustrates the sloped surface as being non-linear. The sloped surface functions to reduce noise during operation by eliminating a straight edged surface which typically causes a whistling noise as air passes the edge. The sloping of the vane front end reduces this noise generation. This allows the vane to be positioned closely to the centrifugal fan to draw off additional quantities of air without additional noise generation. The sloped surface also reduces the amount of vibration of the vane front end, thus further reducing noise generation and increasing air removal efficiencies. A slope angle of about 10–50 degrees and preferably about 20–40 degrees and more preferably about 25–35 degrees results in the desired reduction in noise generation. If the slope is non-linear as shown in FIG. 8, the linear slope formed from the top and bottom ends of the vane, as represented by the dashed line, preferably has an angle of 10–50 degrees. One example of a vane which includes these enhanced features is a vane wherein distance m is about 13–14 inches, distance n is 15.25–16 inches, distance o is 3.5–4.25 inches and angle x is 20–40 degrees.

Referring now to FIG. 6, vane front end 180 includes a tapered edge 182. Tapered edge 182 is designed further to reduce whistling noise and vibration noise as the filtered air is drawn off of centrifugal fan 114 by vanes 170. Preferably, the tapered edge is a smooth curved surface.

Figure 9:
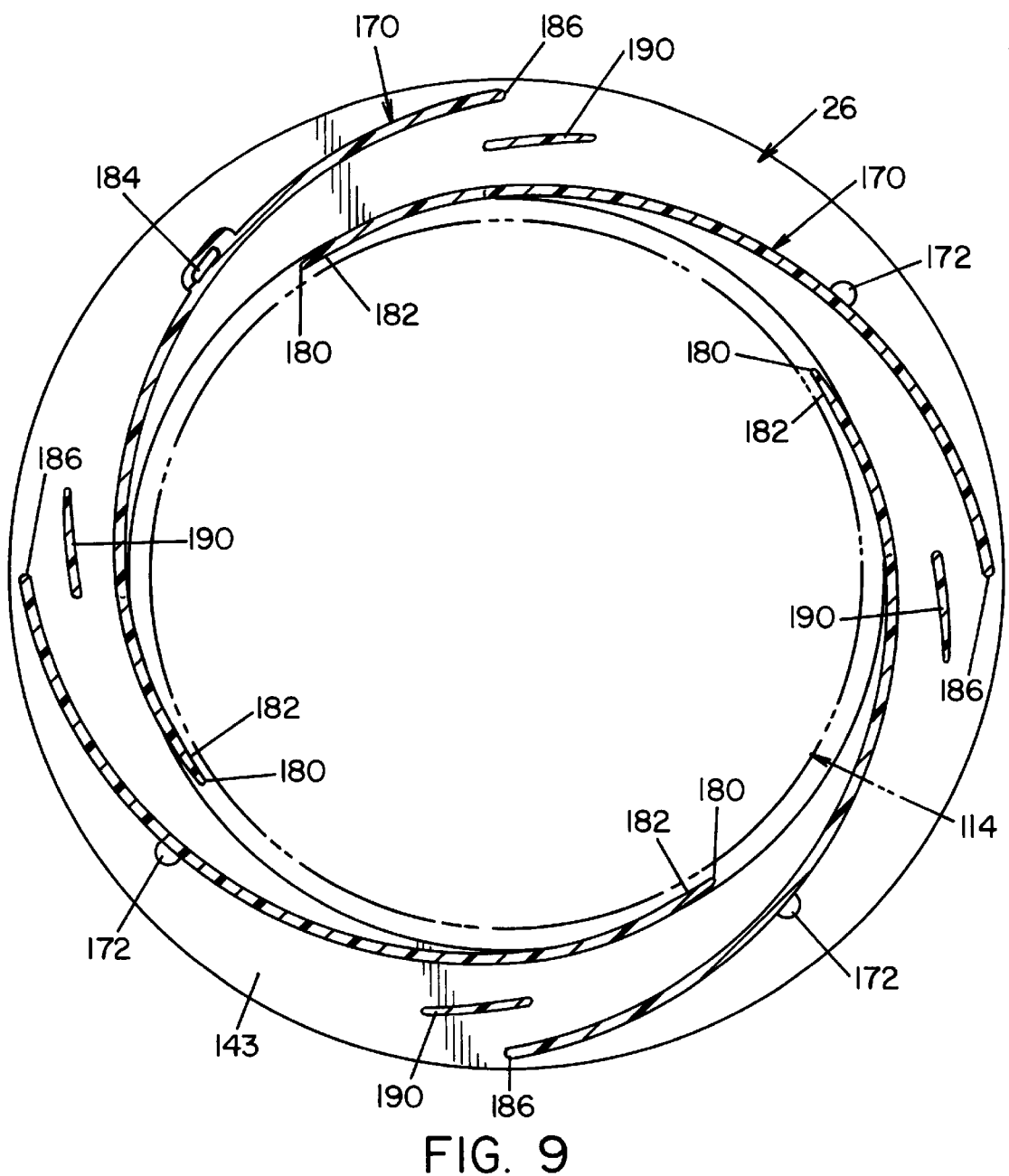

A modification of air exhaust 26 is illustrated in FIG. 9. An air guide 190 is positioned between two vanes 170. The air guide 190 is preferably positioned substantially equal distance from adjacently positioned vanes and is preferably positioned near vane back end 186. The air guide preferably has a height substantially equal to the adjacently positioned vanes but its length is substantially shorter than the vane 170. For vanes of about 14–18 inches, the air guide is preferably about 1–4 inches; however, other lengths may be used. The air guide can include tapered ends and be curved along its longitudinal length. The air guide is designed to even the flow of air being expelled from air exhaust 26. As the expelled air travels along the inner surface of each vane, the air may tend to follow a single narrow path, thus resulting in relatively higher velocities when leaving the air exhaust. The air guide is designed to break up this narrow air path and force the air to flow out relatively uniformly from the vanes. This uniform air flow reduces air velocities from the vanes without impairing air flow which could cause increased pressure drop. For relatively wide spaced vanes, multiple air guides may be used to redirect air flow. The air guides also serve a secondary function to limit access to the interior of the air exhaust.

The specially designed air exhaust significantly reduces the pressure drop between the centrifugal fan and the exterior of the air exhaust. This significant pressure drop reduction allows for small motors to be used or smaller air exhaust surface areas for similar size motors to be used. The vane design also provides for quieter operation. The sloped surfaces and/or tapered edges reduces vibration frequencies which can cause added noise during operation. The unique vane design used in the air exhaust can remove the same volume of air at 20–25% fan speed as compared to standard mesh design air exhausts running at 100% fan speed.

A handle 154 is mounted onto top section 106 so that a user can conveniently move air cleaner 10 to various locations within a room or building. Handle 154 is mounted to top section 106 by handle mount 156 which allows handle 154 to pivot on top section 106. A handle slot 158 is provided in top section 106 such that the handle may be pivoted downwardly into the slot to maintain the handle in a secure position.

The steps of changing particle filter 80 and/or gas filter 160 will now be described. Air cleaner 10 is designed such that the filters within the air cleaner can be conveniently and easily removed and replaced to ensure that the air filters are properly removing particles and gases entrained in the air at the desired efficiency. As discussed above, an operator activates air cleaner 10 by rotating switch knob 153 on switch 152 into an "on" position thereby energizing motor 112 which in turn causes centrifugal fan 114 to begin to rotate. The speed of rotation of centrifugal fan 114 may be adjusted by switch 152. Air cleaner 10 is turned off by the operator rotating switch knob 153 into the off position. The filters within air cleaner 10 are easily removed by the operator tilting air cleaner 10 on its side and removing support knob 64 from threaded surface 62 of motor support 60. Once support knob 64 has been removed from motor support 60, air cleaner 10 is tilted back upon its base. Upper housing 20A is then separated from lower housing 20B by the operator grasping handle 154 and raising upper housing 20A from lower housing 20B. The raising of upper housing 20A causes threaded surface 62 of motor support 60 to retract through support hole 54. The upper housing is completely removed from lower housing by the operator reaching into inner chamber 40 and disengaging motor cord connector 76 from power cord connector 72.

Once upper housing 20A is completely removed from lower housing 20B, particle filter 80 and gas filter 160 are easily removed from inner chamber 40 by lifting the two filters out of the inner chamber. A new particle filter 80 is then reinserted into inner chamber 40 and set into base surface 44 at housing base 30. Gas filter 160 is then inserted within particle filter 80 and coterminous to filter inner layer 86 as illustrated in FIG. 1. Once the filters have been properly inserted into inner chamber 40, upper housing 20A is replaced on lower housing 22B. As upper housing 20A is lowered onto lower housing 20B, the operating reinserts motor cord connector 76 with power connector 72. The upper housing is continue to be lowered on the lower housing. Threaded surface 62 of motor support 60 is easily guided into support hole 54 by guide surface 52. Once threaded surface 62 has been inserted through support hole 54 and the lower housing sealing surface 144 of motor guard 130 are engaged about the peripheral surface 22B near air intake top edge 104, support knob 64 is again rethreaded onto threaded surface 62 of motor support 60. The threading of support knob 64 secures the upper housing to lower housing together.

The invention has been described with reference to a preferred embodiment and alternates thereof. It is believed that many modifications and alterations of the embodiments disclosed will readily suggest themselves to those skilled in the art upon reading and understanding the detailed description of the invention. It is intended to include all such modifications and alterations insofar as they come within the scope of the present invention.

Having thus defined the invention, the following is claimed:

1. A portable air cleaner comprising a housing having an outer peripheral edge and an inner chamber, an air intake, air exhaust means for providing a passageway for the expulsion of air from said inner chamber, a blower to draw air into said inner chamber through said air intake and to expel air from said inner chamber through said air exhaust means, a filter disposed in said inner chamber between said air intake and air exhaust means, the improvement comprising said exhaust means having a plurality of arcuate vanes radiating outwardly from said blower, said arcuate vanes directing said air in a substantially unobstructed manner to said outer peripheral sides of said housing.

2. An air cleaner as defined in claim 1, wherein each of said arcuate vanes having a length and having a varying radius of curvature over at least a section of said length of said vane.

3. An air cleaner as defined in claim 1, wherein each of said vanes has two ends, said first end positioned closer to said blower than said second end, said second end defining at least a portion of said outer peripheral edge of said housing.

4. An air cleaner as defined in claim 2, wherein each of said vanes has two ends, said first end positioned closer to said blower than said second end, said second end defining at least a portion of said outer peripheral edge of said housing.

5. An air cleaner as defined in claim 1, wherein at least one of said vanes overlaps at least a portion of an adjacently positioned vane.

6. An air cleaner as defined in claim 2, wherein at least one of said vanes overlaps at least a portion of an adjacently positioned vane.

7. An air cleaner as defined in claim 4, wherein at least one of said vanes overlaps at least a portion of an adjacently positioned vane.

8. An air cleaner as defined in claim 3, wherein said blower includes an axis of rotation and said first vane end including a front face having a sloped surface along at least a portion of said first vanes end, said sloped surface being nonparallel to said axis of rotation of said blower.

9. An air cleaner as defined in claim 4, wherein said blower includes an axis of rotation and said first vane end including a front face having a sloped surface alone at least a portion of said first vanes end, said sloped surface being nonparallel to said axis of rotation of said blower.

10. An air cleaner as defined in claim 7, wherein said blower includes an axis of rotation and said first vane end including a front face having a sloped surface along at least a portion of said first vane end, said sloped surface being nonparallel to said axis of rotation of said blower.

11. An air cleaner as defined in claim 8, wherein said slope surface being substantially linear.

12. An air cleaner as defined in claim 11, wherein said slope surface has a slope angle of about 20 to about 40 degrees.

13. An air cleaner as defined in claim 10, wherein said slope surface being substantially linear.

14. An air cleaner as defined in claim 13, wherein said slope surface has a slope angle of about 20 to about 40 degrees.

15. An air cleaner as defined in claim 3, wherein said first vane end being tapered.

16. An air cleaner as defined in claim 4, wherein said first vane end being tapered.

17. An air cleaner as defined in claim 9, wherein said first vane end being tapered.

18. An air cleaner as defined in claim 14, wherein said first vane end being tapered.

19. An air cleaner as defined in claim 1, including at least one air flow distributor positioned between two of said vanes.

20. An air cleaner as defined in claim 2, including at least one air flow distributor positioned between two of said vanes.

21. An air cleaner as defined in claim 10, including at least one air flow distributor positioned between two of said vanes.

22. An air cleaner as defined in claim 18, including at least one air flow distributor positioned between two of said vanes.

23. An air cleaner as defined in claim 3, wherein said first vane end being positioned about 0.05 to about 0.5 inch from said blower.

24. An air cleaner as defined in claim 22, wherein said first vane end being positioned about 0.05 to about 0.5 inch from said blower.

25. An air cleaner as defined in claim 1, wherein said air intake and said exhaust means positioned substantially about the periphery of said housing.

26. An air cleaner as defined in claim 24, wherein said air intake and said exhaust means positioned substantially about the periphery of said housing.

27. An air cleaner as defined in claim 1, wherein said housing includes a lower section and an upper section, said air intake proving an air passageway through said lower section and into said inner chamber, said exhaust means proving an air passageway through said upper section for expelling air from said inner chamber.

28. An air cleaner as defined in claim 26, wherein said housing includes a lower section and an upper section, said air intake proving an air passageway through said lower section and into said inner chamber, said exhaust means proving an air passageway through said upper section for expelling air from said inner chamber.

29. An air cleaner for removing air particles comprising a generally cylindrical housing divided into an upper cavity, a lower cavity, an air intake, a filter, an air exhaust, a cavity passageway and a blower; said upper cavity having an exterior surface, a bottom edge and an interior compartment; said lower cavity having a base, a top edge, an outer surface, an inner surface and an inner compartment; said lower and upper cavity sealed together by a sealing arrangement which sealably connects said upper cavity bottom edge to said lower cavity top edge; said air intake positioned circumferentially about said lower cavity outer surface to provide a passageway for said air to be drawn into said lower cavity inner compartment; said filter positioned in said lower cavity inner compartment and closely adjacent to said inner surface to filter said air drawn into said lower cavity inner compartment; said air exhaust means positioned circumferentially about said upper cavity exterior surface for providing a passageway for said air to be expelled from said upper cavity interior compartment; said cavity passageway positioned in said housing to form a passageway between said lower cavity inner compartment and said upper cavity interior compartment; said blower mounted in said upper cavity to draw air through said air intake through said filter into said lower cavity inner compartment, through said cavity passageway means, into said upper cavity interior compartment and expelling air out said air exhaust means; said air exhaust means including a plurality of arcuate vanes radiating outwardly from said blower, each of said vanes having a length and two ends, each of said vanes having a varying radius of curvature over at least a section of said length of said vane, said first end of said vane positioned closer to said blower than said second end of said vane, said second end defining at least a portion of said exterior surface of said upper cavity said arcuate vanes directing said air in a substantially unobstructed manner to said exterior surface of said upper cavity.

30. An air cleaner as defined in claim 29, wherein said lower cavity base includes a damper for reducing noise during operation of said motor, said damper including a material selected from the group consisting of rubber, plastic, foam and mixtures thereof.

31. An air cleaner as defined in claim 29, wherein said blower includes a centrifugal fan.

32. An air cleaner as defined in claim 29, wherein at least one of said vanes overlaps at least a portion of an adjacently positioned vane.

33. An air cleaner as defined in claim 29, wherein said blower includes an axis of rotation and said the first vane end including a front face has a sloped surface along at least a portion of said first vane end, said sloped surface being nonparallel to said axis of rotation of said blower.

34. An air cleaner as defined in claim 32, wherein said blower includes an axis of rotation and said the first vane end including a front face has a sloped surface along at least a portion of said first vane end, said sloped surface being nonparallel to said axis of rotation.

35. An air cleaner as defined in claim 3, wherein said slope surface has a slope angle of about 20 to about 40 degrees.

36. An air cleaner as defined in claim 34, wherein said slope surface has a slope angle of about 20 to about 40 degrees.

37. An air cleaner as defined in claim 29, wherein said first vane end being tapered.

38. An air cleaner as defined in claim 36, wherein said first vane end being tapered.

39. An air cleaner as defined in claim 29, including at least one air flow distributor positioned between two of said vanes.

40. An air cleaner as defined in claim 38, including at least one air flow distributor positioned between two of said vanes.

41. An air cleaner as defined in claim 29, wherein said first vane end being positioned about 0.05 to about 0.5 inch from said blower.

42. An air cleaner as defined in claim 40, wherein said first vane end being positioned about 0.05 to about 0.5 inch from said blower.

43. An air exhaust arrangement for a blower comprising an outer peripheral edge, a blower housing, a fan, and blower exhaust means providing an air passageway for the expulsion of air from said blower housing, said blower housing including a fan cavity, said fan mounted for rotational movement about a blower axis to said blower housing, said blower exhaust means including a plurality of arcuate vanes radiating outwardly from said fan, each of said vanes having a length and two ends, each of said vanes having a varying radius of curvature over at least a section of said length of said vane, said first end of said vane positioned closer to said fan than said second end of said vane, said arcuate vanes directing said air in a substantially unobstructed manner to said outer peripheral edge.

44. An air exhaust arrangement as defined in claim 43, wherein at least one of said vanes overlaps at least a portion of an adjacently positioned vane.

45. An air exhaust arrangement as defined in claim 43, wherein said first end of said vane including a front face having a sloped surface along at least a portion of said first vane end, said sloped surface being nonparallel to said blower axis.

46. An air exhaust arrangement as defined in claim 44, wherein said first end of said vane including a front face having a sloped surface along at least a portion of said first vane end, said sloped surface being nonparallel to said blower axis.

47. An air exhaust arrangement as defined in claim 44, wherein said sloped surface being substantially linear and having a slope angle of about 20 to about 40 degrees.

48. An air exhaust arrangement as defined in claim 46, wherein said first end of said vane being a sloped surface.

49. An air exhaust arrangement as defined in claim 43, wherein said first end of said vane being tapered.

50. An air exhaust arrangement as defined in claim 46, wherein said first end of said vane being tapered.

51. An air exhaust arrangement as defined in claim 48, wherein said first end of said vane being tapered.

52. An air exhaust arrangement as defined in claim 43, wherein said first end of said vane being positioned about 0.05 to about 0.5 inch from said fan.

53. An air exhaust arrangement as defined in claim 51, wherein said first end of said vane being positioned about 0.05 to about 0.5 inch from said fan.

54. An air exhaust arrangement as defined in claim 43, including at least one air flow distributor positioned between two of said vanes.

55. An air exhaust arrangement as defined in claim 46, including at least one air flow distributor positioned between two of said vanes.

56. An air exhaust arrangement as defined in claim 51, including at least one air flow distributor positioned between two of said vanes.

57. An air exhaust arrangement as defined in claim 43, wherein said second end of said vane defining at least a portion of said outer peripheral edge.

58. An air exhaust arrangement as defined in claim 56, wherein said second end of said vane defining at least a portion of said outer peripheral edge.

* * * * *